United States Patent [19]

Lidholt

[11] Patent Number: 4,490,006
[45] Date of Patent: Dec. 25, 1984

[54] CENTERING PIECE FOR A PRECISION JUNCTION FOR OPTICAL FIBRES

[76] Inventor: Lars R. Lidholt, Skogsmyrsvägen 4 A, S-752 45 Uppsala, Sweden

[21] Appl. No.: 375,125
[22] PCT Filed: Aug. 21, 1981
[86] PCT No.: PCT/SE81/00233
§ 371 Date: Apr. 19, 1982
§ 102(e) Date: Apr. 19, 1982
[87] PCT Pub. No.: WO82/00720
PCT Pub. Date: Mar. 4, 1982

[30] Foreign Application Priority Data

Aug. 21, 1980 [SE] Sweden ................ 8005871

[51] Int. Cl.³ .............................................. G02B 7/26
[52] U.S. Cl. .................................................. 350/96.20
[58] Field of Search ........................... 350/96.20, 96.21

[56] References Cited

U.S. PATENT DOCUMENTS

| | | | |
|---|---|---|---|
| 4,087,155 | 5/1978 | Deacon | 350/96.21 |
| 4,158,476 | 6/1979 | McCartney | 350/96.21 |
| 4,181,402 | 1/1980 | Borsuk et al. | 350/96.21 |
| 4,208,093 | 6/1980 | Borsuk | 350/96.20 |
| 4,378,145 | 3/1983 | Stancati et al. | 350/96.21 |
| 4,389,091 | 6/1983 | Lidholt et al. | 350/96.20 |

Primary Examiner—John Lee
Assistant Examiner—Akm E. Ullah
Attorney, Agent, or Firm—Pollock, Vande Sande & Priddy

[57] ABSTRACT

Centering piece having an exterior conical surface (14) for centering an optical fibre (20) in a connector member (4) intended for assembly with another connector member which has a matching interior cone. The centering piece has at one end an adaptor (2, 3) to the connector member (4), and at its other end a truncated exterior conical surface (14) at the outer end of which there is a circle (6) defining an end plane (1), a through-hole (7) passing from end to end and an arrangement for centering (8, 9, 10), at the center of the circle, an inserted end of an optical fibre. The arrangement may be a precision-centered hole which centers the fibres when cast in plastic, or an outwardly open exterior cone, cooperating either with a centering body with a hole or with a plurality of centering bodies in the form of balls.

11 Claims, 4 Drawing Figures

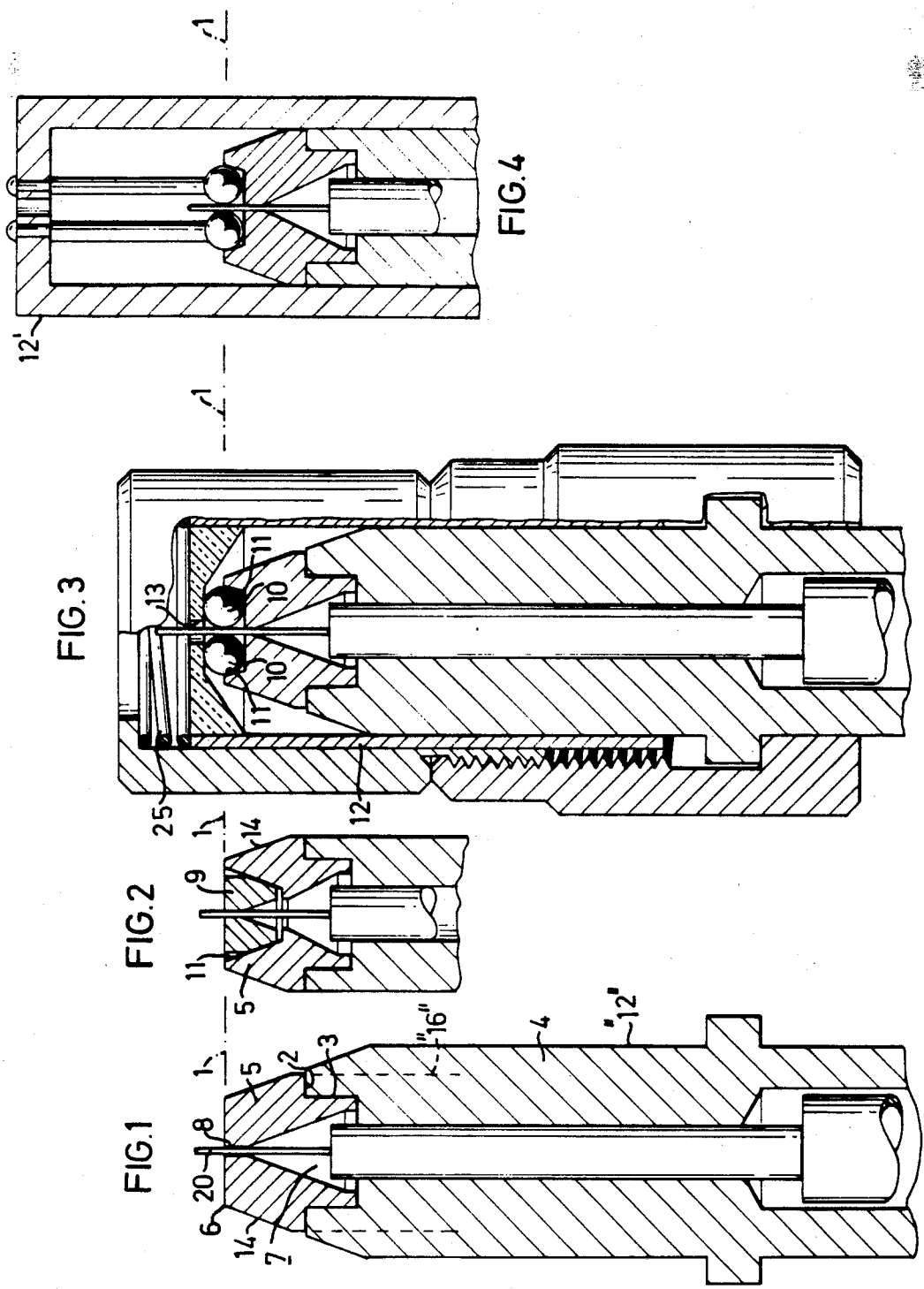

CENTERING PIECE FOR A PRECISION JUNCTION FOR OPTICAL FIBRES

The invention relates to improved connecting means for optical fibres, permitting them to be simply connected to each other or to an emitter or receiver of optical radiation.

For some time it has been clear that optical fibres will be an important competitor of electrical conductors as regards the transmission of information, especially since they have a very high signal capacity thanks to the possibility of working with high electromagnetic frequencies.

An optical fibre of the type in question functions as a wave guide for optical radiation. A so-called step index fibre consists of a core of glass or quartz with a high index of refraction and a surrounding jacket of glass or plastic with a lower index of refraction than that of the core. In a variant of this step index fibre, the so-called gradient index fibre, the index of refraction of the core varies continuously from high at the axis of the core to low at the edge of the core. For production reasons, this core is also surrounded by a glass-like jacket. For protection against mechanical damage, a practically usable fibre cable has also been provided on the outside with a number of layers of plastic material. To date, there is no standard for fibre diameters, but at present two especially advantageous types are available with regard to transmission characteristics and dimensions. One type of step index fibre has a core diameter of 100 μm and a jacket diameter of 140 μm. A suggested standard for gradient index fibre has a core diameter of 50 μm and a jacket diameter of 125 μm.

The problems involved in connecting such fibres are described in detail in applicant's patent applications 8003467-1 and 8003509-0.

By way of summary, it can be noted that the problem of jointing with connectors is to minimize optical radiation losses, preferably to less than 1 dB per joint. This means that a detachable connector must be able to achieve centering between two fibres within 5 μm, for example, when the fibre core is about 50 μm.

The solution used according to the above-mentioned patent applications is based on arranging a fibre in a holder directly in the centre of an external conical surface, two such holders being simply fitted to each other by means of an intermediate piece which has two coaxial internal conical surfaces opening in either direction.

The present invention addresses itself to the problem of mounting a fibre with satisfactory precision so that it is disposed on the axis of an external conical surface in such a connector member. The connector member is designed to be so functionally simple that it can meet military requirements for shock and temperature, i.e., $-55°$ to $+125°$ C.

Previous attempts have been made to centre fibres in mountings although not built on the conical principle, but these have encountered certain problems. In a known arrangement, inside a connector piece with an external fitting surface, a centered hole is arranged with an interior conical surface against which centering is achieved by means of three precision-made balls surrounding the fibre. One difficulty is that, although the balls guarantee a good adaption to the conical axis of the connector piece, they do not guarantee that the fibre will be on the conical axis at the truncated connector end of the external cone, since there is a certain distance to the location where the balls centre the fibre. It is thus necessary to centre the fibre at one more location, which can be accomplished, for example, with balls against another conical surface. It is, however, difficult to guarantee that the fibre is straight, and the additional centering means involve extra costs and complications. It is desirable to avoid the use of "watchmaker" methods when connecting optical fibres, and it is preferable to achieve methods which are also suitable, as far as possible, under military field conditions and in inclement weather.

Swedish Patent Application No. 8003509-0 suggests centering via a special centering piece which can be removed and which, during curing of a holding plastic, centers a fibre in a hole.

According to the present invention, however, the task of centering an optical fibre at a truncated outer end of an externally conical surface of a connector member is fulfilled by fastening a special precision-made piece in the connector member which otherwise need not be made with higher precision than ordinary machine shop tolerances.

The invention will now be described in more detail with reference to the accompanying drawings, in which FIG. 1 shows a first embodiment. FIG. 2 shows a second embodiment. FIG. 3 shows a third embodiment and FIG. 4 shows a variant of the third embodiment.

In the first embodiment shown in FIG. 1, an optical fibre 20, which has two different protective jackets, is stripped at one end, which is inserted into a connector member 4. Of the type described in the above-mentioned applications, connector member 4 may have a shoulder 2 for pressing against another connector member, possibly via an intermediate spring, and at the end opposite to the fibre end the jacketed fibre may be attached by crimping, gluing or the like.

The invention relates to the centering piece 5 which is mounted on the point of the connector member 4. It has an external conical surface 14 terminating in a truncation along a circle 6, which defines a plane 1. Even though, for the sake of illustration the fibre 20 is shown as protruding, in the finished connection it is to be optically planar in the plane 1.

The centering piece is inserted into a hole in the end of the connector member 4 which has a forced fit against the cylindrical surface 3 of the centering piece. The centering piece is pressed in until contact is made with the shoulder 2. It is also possible to use a threaded connection or the like, although a forced fit is preferred at present. The forced fit between the centre piece 5 and the connector member 4 can be inverted with regard to the boundary surface 3.

According to this first embodiment, the centering of the fibre 20 to the centre of the circle 6 is accomplished by having a hole 8 in the centering piece, said hole being precision-centered to a tolerance of 2 μm for a gradient index core of diameter 50 μm. This is possible by using the services of a specialized manufacturer, for example Gemini Decolletage, Bevaix, Switzerland, who are able to make the centre piece with reliable precision. The recent development of numerical-control machine tools should increase the offerings from similar manufacturers. For a 125 μm gradient index fibre, the diameter of the hole should be $127_{-0}^{+2}$ μm. In a fibre of 140 μm in thickness, the diameter should be $142_{-0}^{+2}$ μm. It should be noted that the protective plastic need not be stripped off more than 2 mm in an assembled contact according to the invention.

In assembly, the fibre is dipped into a thermosetting plastic, e.g., UV-setting, and is then inserted into the hole. Additional thermosetting plastic is then possibly added from outside. When the plastic has set, the fibre is ground down to the surface 1 and is polished. It is most suitable to use a set of grinding fixtures into which the outer cone 5 fits and which make it possible to grind and polish against a set of flat abrasive films.

There appears to be a centering effect as the plastic hardens, so that the fibre tends to be centered. This effect appears to be increased if a thermosetting plastic is used with a low viscosity activator into which the end of the fibre 20 is first dipped and then the thermosetting plastic applied. It is likely that this hardening proceeding from the interior and outwards tends to pull the fibre towards the centre of the hole 8. The product used was Locktite ® Multi-Bond, which is a two-component product. Thermosetting plastics with high viscosity also have a centering effect.

As shown schematically in FIG. 1, the centering piece can either be adapted to a connector member which is somewhat thicker and is designated pin No. 12 according to the MIL-specifications for electrical equipment, or to a somewhat thinner pin designated No. 16 and which is considered to be suitable for multi-pole connectors for connecting bundles comprising a plurality of separate optical fibres.

FIG. 2 shows a second embodiment, in which the centering means consists of a small cone 9 of plastic, metal or the like, which has a hole central to an external conical surface. This cone fits into an interior cone 11 which is concentric to the exterior cone 14 and opens outwards. In order to obtain elastic abutment against the fibre, the cone can be made of elastomer material or of hard material with longitudinal slots through the cone.

FIG. 3 shows a third embodiment in which the centering means, except for an interior cone 11 of essentially the same type as in the second embodiment, consists of a number of balls 10, e.g. three. As mentioned hereinabove the use of balls to centre an optical fibre is known per se. However, in the known case the balls are arranged relatively far from the surface 1 and behind said surface. The guide points can then in practice hardly be kept sufficiently close to the surface 1 to prevent angular misalignment from producing an excessive error at the surface 1.

It is known to arrange a coupling by means of three projecting balls fitting against three similar projecting balls in another member which are rotated 60° about the axis of symmetry. This is, however, foreign to the purpose of the present embodiment which intends to use balls to centre a fibre in relation to an interior cone and in an accessible plane 1. In order to make the plane for centering accessible, e.g., for cleaning the end surface of the fibre, it is necessary to first fix the balls and the fibre in place, by means of thermosetting resin, for example, and then grinding down the balls and the plastic to the plane 1. When the contact is finished, only about half of the balls will remain.

According to this third embodiment, a special sleeve 12 of metal or UV-transmitting plastic, for example, is used when the casting is done. Prior to use, and preferably in the delivered, unassembled connector, the sleeve and balls may be kept assembled, thus holding the balls in place. During assembly the sleeve is lifted somewhat to facilitate the introduction of the fibre, whereafter plastic is introduced via the sleeve hole 13, and the sleeve is then again pressed down thus pressing with one surface the balls against the cone 11 and the fibre 20. After the plastic has hardened and the grinding has been completed, the sleeve can be used as a protector until the member has been connected. If UV-setting plastic has been used, balls of glass with high quartz content can be used to advantage.

It is also possible to remove the balls before grinding, because they are not held fast by a recess.

In a variation of the third embodiment, as shown in FIG. 4, the possibility of removing the balls after completed hardening is exploited. In this case, in which the geometry is otherwise similar to that shown in FIG. 4, the balls are fixed on long pins which are radially somewhat flexible and which are mounted inside a sleeve 12', which is slipped onto the connector member 4. For purposes of illustration, the cross-sectional views in FIGS. 3 and 4 are schematic, inter alia to the extent that a central section with three balls 10 would not actually show two balls in the same sectional plane. Furthermore, while three balls, are preferred, four balls, for example, can be used. Both the sleeves 12 and 12' can be provided with spring inserts 25, shown in FIG. 3, to make the abutment properly hard and independent of the force of the assembling person or machine.

Furthermore it is suitable, as regards the examples according to FIGS. 2 to 4, to form the interior cone 11 with the same conic angle as the external cone 14. This makes it possible to turn the surface 14 and the surface 11 in one operation, by means of cutting edges moved in the same direction, whereby the axes of the cones coincide because they coincide with the axis of rotation of the workpiece.

The centering piece of the invention can be made of brass or stainless steel, the latter being preferable in view of its resistance to corrosion. UV-transparent or other plastic can sometimes be advantageous for rapid assembly of simpler members.

It is noted that the exterior conical surface is terminated at a circle which defines an end plane. This does not preclude this circle from being located somewhat outside the finished body, since it may be desirable to round off the transition between the cone 5 and the plane 1; this does not change the principle of the invention and its central point, namely that the centering is to take place in the plane 1, i.e., at the outer end. In the embodiments where balls are used, it can also occur that these contact points with the fibre do not fall exactly in the plane 1, inter alia because of measurement tolerances in the manufactured parts. This, too, does not affect the relationship that the centering occurs essentially in the plane of the outer end of the centering piece.

What is claimed is:

1. Centering piece having means for mounting in a connector member for optical fibres, for centering and fixing the position of an end of an optical fibre in a center hole in the centering plane, said centering piece (5) consisting of a body rotatable about an axis coinciding with said center hole (8) and having in one direction a stiff frusto-conical exterior surface (14), the exterior conical surface of which, by virtue of the fact that it is centered in relation to the axis, acts as a support and fitting surface against an interior conical surface fitting thereon in another connector member, centering means being arranged to center said optical fibre (20) in the middle of said axis of the rotatable body.

2. Centering piece as claimed in claim 1, including adaptor means consisting of a shoulder (2) parallel to said circle and a cylindrical surface (3) concentric with the axis of said exterior conical surface.

3. Centering piece as claimed in claim 2, wherein said concentric cylindrical surface is threaded.

4. Centering piece as claimed in any one of claims 1 to 3, wherein said means for centering said fibre consists of a hole centered to said axis with an accuracy of at least 5 μm.

5. Centering piece as claimed in claim 4, wherein said hole is centered to said axis with an accuracy of 2 μm.

6. Centering piece as claimed in any one of claims 1 to 3, wherein said means for centering said fibre comprise an outwardly opening interior conical surface (11) concentric with said exterior conical surface.

7. Centering piece as claimed in claim 6, wherein said interior conical surface and said exterior conical surface have equal angles of conicity.

8. Centering piece as claimed in claim 7, wherein said means for centering comprise a centering body (9) arranged to bear against said interior conical surface and against said fibre.

9. Centering piece as claimed in claim 8, wherein said centering body has an exterior conical surface fitting said interior conical surface, and a hole adapted for said fibre and centered in relation to said exterior conical surface of said centering body.

10. Centering piece as claimed in claim 8, wherein said centering body (9) is made of plastic.

11. A method of centering an optical fibre in a contact having a longitudinal hole provided therefore, said contact having a conical exterior centering surface (14), including the steps of providing at the end of said contact an outwardly diverging interior cone (11) concentric to said exterior cone (14), arranging an end of said optical fibre to project outwardly into said interior cone, arranging a plurality of balls around said fibre in contact therewith and with said interior cone (11), fixing said balls and said fibre in place, and then grinding down said balls from the front side of said contact until only about half of said balls remain.

* * * * *